(12) United States Patent
Nelson

(10) Patent No.: US 7,280,803 B2
(45) Date of Patent: **\*Oct. 9, 2007**

(54) MONITORING NETWORK PERFORMANCE USING INDIVIDUAL CELL PHONE LOCATION AND PERFORMANCE INFORMATION

(75) Inventor: Roderick Nelson, Fall City, WA (US)

(73) Assignee: Cingular Wireless II, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/745,268

(22) Filed: Dec. 21, 2000

(65) Prior Publication Data

US 2004/0038687 A1    Feb. 26, 2004

Related U.S. Application Data

(60) Provisional application No. 60/173,614, filed on Dec. 29, 1999.

(51) Int. Cl.
*H04B 17/00* (2006.01)
*H04Q 7/20* (2006.01)

(52) U.S. Cl. .................. 455/67.11; 455/67.14; 455/423; 455/456.1; 455/456.2

(58) Field of Classification Search ............... 455/423, 455/446, 456.1, 456.5, 404.2, 504–506, 67.11, 455/67.14, 439, 436

See application file for complete search history.

(56) References Cited

U.S. PATENT DOCUMENTS

| | | | |
|---|---|---|---|
| 5,027,343 A | 6/1991 | Chan et al. | |
| 5,070,536 A | 12/1991 | Mahany et al. | |
| 5,257,407 A | 10/1993 | Heinzelmann | |
| 5,307,510 A | 4/1994 | Gunmar et al. | |
| 5,451,839 A * | 9/1995 | Rappaport et al. | 375/224 |
| H1641 H | 4/1997 | Sharman | |
| 5,768,689 A | 6/1998 | Borg | |
| 5,774,695 A | 6/1998 | Autrey et al. | |
| 5,799,154 A | 8/1998 | Kuriyan | |
| 5,802,105 A | 9/1998 | Tiedemann, Jr. et al. | |
| 5,802,473 A | 9/1998 | Rutledge et al. | |
| 5,878,328 A | 3/1999 | Chawla et al. | |
| 5,884,163 A | 3/1999 | Hardouin | |
| 5,913,162 A | 6/1999 | Gourdin et al. | |
| 5,924,029 A | 7/1999 | Sohngen et al. | |
| 5,926,762 A | 7/1999 | Arpee et al. | |
| 5,973,643 A * | 10/1999 | Hawkes et al. | 342/457 |
| 6,035,183 A | 3/2000 | Todd et al. | |
| 6,052,593 A | 4/2000 | Guimont et al. | |
| 6,148,194 A | 11/2000 | Kao et al. | |
| 6,275,186 B1 * | 8/2001 | Kong | 342/363 |
| 6,424,837 B1 * | 7/2002 | Hall et al. | 455/456.5 |

(Continued)

*Primary Examiner*—George Eng
*Assistant Examiner*—Un C. Cho
(74) *Attorney, Agent, or Firm*—Michael J. Donohue; Davis Wright Tremaine LLP

(57) ABSTRACT

A system and method of collecting call data from a Mobile Telephone Switching Office and combining this data with location information of a wireless device (or devices) to generate information reports concerning the electromagnetic coverage of a cell site. The collection of call data from a switch permits consideration of uplink information in the analysis of system performance. This information combined with location information obtained using a time difference of arrival (TDOA) technique allows the cell site to be evaluated and to remove transient effects associated with, for example, local terrain and other physical impairments.

31 Claims, 3 Drawing Sheets

U.S. PATENT DOCUMENTS 6,445,916 B1 * 9/2002 Rahman .................... 455/423
6,477,363 B1 * 11/2002 Ayoub et al. ............ 455/404.2
6,522,888 B1 * 2/2003 Garceran et al. ........ 455/456.3
6,603,966 B1 * 8/2003 Sheffield .................... 455/423
6,650,896 B1 * 11/2003 Haymes et al. ............ 455/423

* cited by examiner

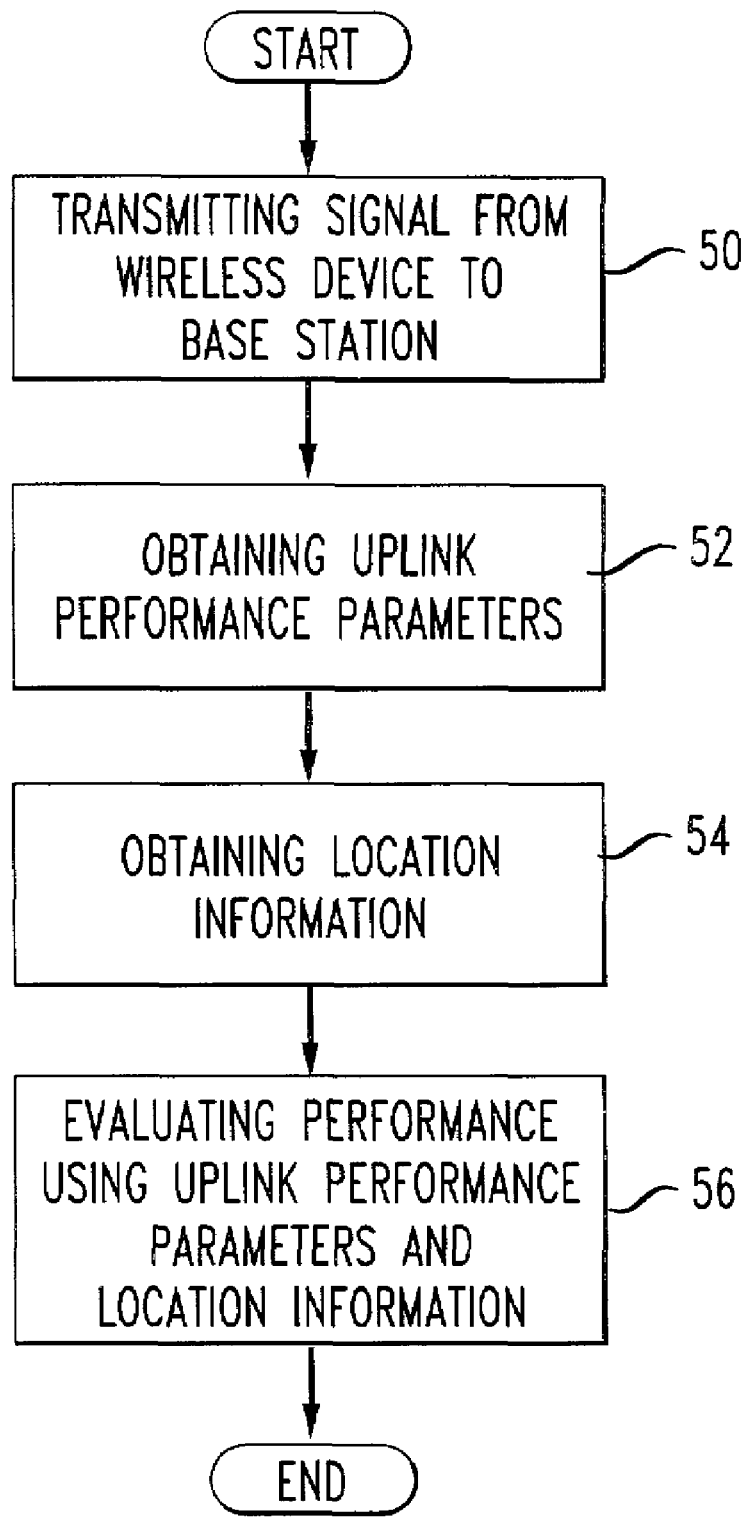

MONITORING NETWORK PERFORMANCE USING INDIVIDUAL CELL PHONE LOCATION AND PERFORMANCE INFORMATION

CROSS REFERENCE TO RELATED APPLICATIONS

This application claims the benefit under 35 U.S.C. Section 119(e) to Provisional Application No. 60/173,614, filed Dec. 29, 1999, the contents of which are incorporated herein by reference.

FIELD OF THE INVENTION

The present invention relates to mobile communications systems and, more specifically, to a system for optimizing performance of a mobile communications system.

BACKGROUND OF THE INVENTION

FIG. 1 shows a block diagram of a conventional cellular radiotelephone communication system 5 which includes cells 6, radio base stations or cell sites 8, and a Mobile Telephone Switching Office (MTSO) or mobile telephone switching center 9. As a mobile telephone customer 7 moves from one cell to another, a switch in the MTSO 9 automatically switches connections with the respective radio base stations 8 to maintain a continuous connection with the public switched network (not shown). Typically, a switch in a Mobile Switching Telephone Office is connected to approximately one hundred cell sites.

A problem associated with the management of a cellular radiotelephone communications system is geographically locating an area within the zone of radio coverage or cell where faulty coverage exists. For example, an area within a cellular telephone system may provide poor service due to moderate levels of interference. Typically, this situation is discovered through customer complaints or a persistent drive team testing by system operators. Neither of these approaches, however, provides very timely or comprehensive means of identifying, diagnosing, and curing faulty coverage.

In response to these deficiencies, the cellular industry has turned to the aid of electromagnetic coverage prediction tools to assist in the search for holes in the coverage. Typically, such methods of monitoring system performance include observing downlink information along with other system parameters. The term "downlink" signals from the cell site to the mobile unit and the term "uplink" means signals traveling from the mobile unit to the cell site. Observing the downlink connection provides evidence of the status of the uplink connection. The assumption is that if the downlink was closed (i.e., a good connection was attained), the available uplink power would be sufficient to close the uplink.

SUMMARY OF THE INVENTION

The present invention generally comprises a method and system for monitoring the performance of a wireless telecommunications system. The preferred embodiment involves a method and system of evaluating the coverage of a geographic area serviced by a mobile communications system.

An aspect of the present invention includes a method of monitoring performance of a wireless system. The method comprises transmitting a communication signal from a wireless device to a radio base station; obtaining uplink performance parameters associated with the communication signal; obtaining location information of the wireless device by analyzing the communication signal; and evaluating the performance of the wireless system using the uplink performance parameters and the location information of the wireless device.

Another aspect of the present invention includes a system for monitoring performance of a wireless system. This system comprises: a plurality of wireless devices which transmit communications signals to a radio base station; a first means for receiving the communication signals and transmitting the communication signals to a switch; a second means for monitoring the communication signals and transmitting timestamp data associated with the communication signals to the switch; and a system analyzer coupled to the switch which evaluates the performance of the wireless system based on uplink performance parameters and the location of the wireless device.

Another aspect of the present invention includes a system for monitoring performance of a wireless system, the system comprises: a plurality of wireless devices which transmit communications signals to a radio base station; a first receiver located at the radio base station which receives the communication signals and transmits the communication signals to a switch; a second receiver located at the radio base station which monitors the communication signals and transmits timestamp data associated with the communication signals to the switch; and a system analyzer coupled to the switch which evaluates the performance of the wireless system based on uplink performance parameters and the location of the wireless devices.

Another aspect of the present invention includes a system for monitoring performance of a wireless system, this system comprises: a plurality of wireless devices which transmit communications signals to a radio base station; a first means for receiving the communication signals and transmitting the communication signals to a switch; a second means for monitoring the communication signals and transmitting timestamp data associated with the communication signals to the switch; and a system analyzer coupled to the switch which evaluates the performance of the wireless system based on uplink performance parameters and the location of the wireless devices.

BRIEF DESCRIPTION OF THE DRAWINGS

The present invention may be understood with reference to the attached drawings and accompanying description, in which:

FIG. 3 is a flow chart illustrating a method according to an aspect of the present invention.

DETAILED DESCRIPTION OF THE PREFERRED EMBODIMENT

In the preferred embodiment, call data collected from the switch at the Mobile Telephone Switching Office (MTSO) or mobile switching center is combined with location information of a wireless device to generate information reports concerning the signal coverage of a geographic region.

Collecting call data from the switch at the switching center permits consideration of uplink and also downlink information in the analysis of system performance. The uplink information reflects performance of specific equipment currently used by the wireless customer. This uplink information may be combined with location information to remove from the performance evaluation transient effects associated with, for example, local terrain and other physical impairments.

Figure 1:
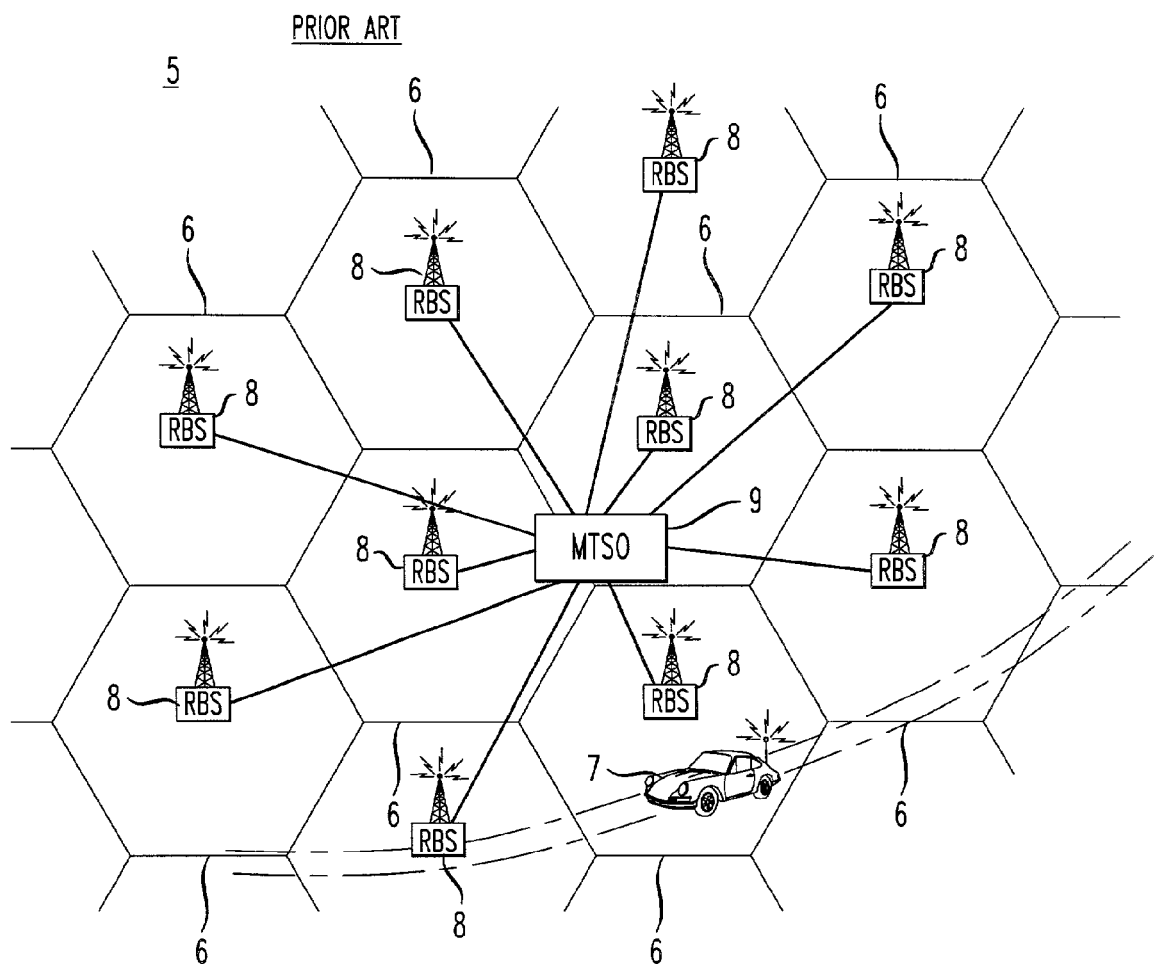
FIG. 1 is a block diagram of a conventional radiotelephone system.
Figure 2:
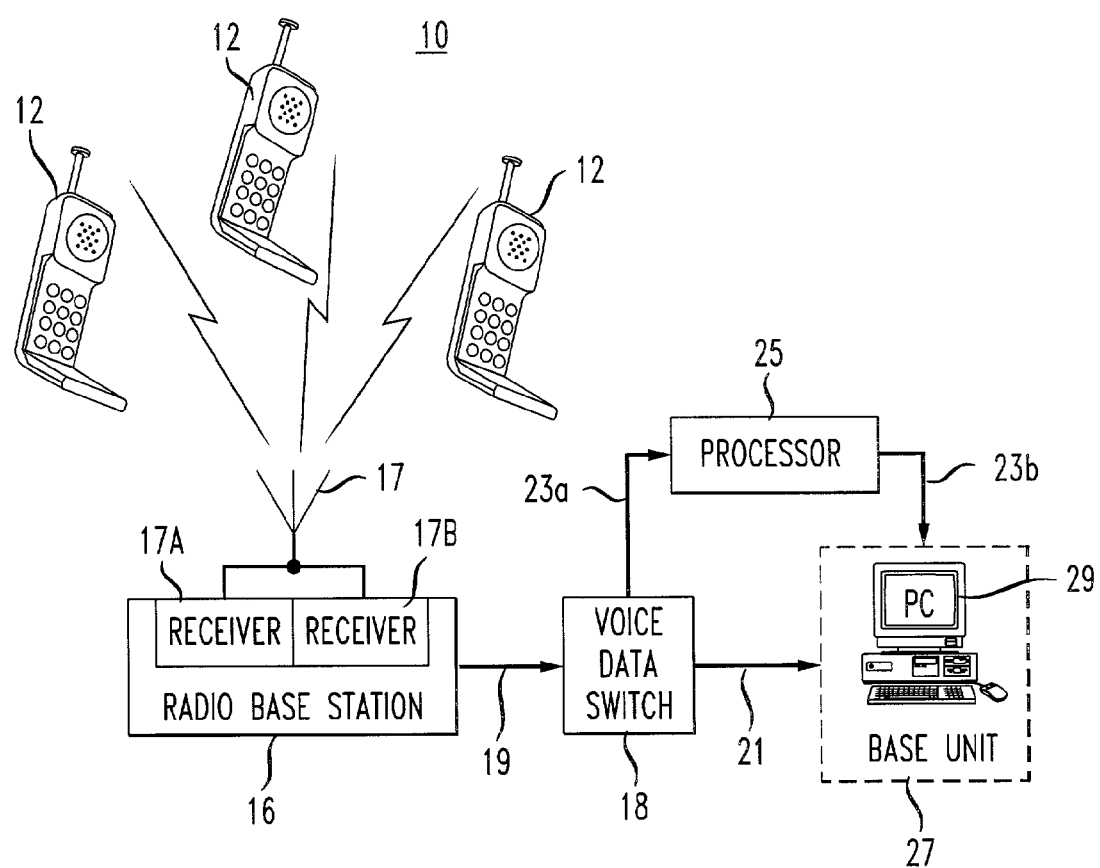
FIG. 2 is a block diagram of a system for optimizing a mobile communication system according to a preferred embodiment.

FIG. 2 is a diagram of a communication system 10 illustrating a preferred embodiment of the present invention. Since it is understood by those skilled in the art that other components and devices are typically included in this embodiment, only those pertinent to the preferred embodiment will be discussed.

As shown in FIG. 2, a plurality of wireless devices 12 surrounds a radio base station 16 to form a cell. The plurality of wireless devices 12 may include cellular telephones, computers, personal communication systems, paging devices, or some other type of communication device. This discussion uses the term "cellular" to indicate any type of mobile communication system—analog or digital—which divides a region into geographic areas (cells) and involves handing off of the mobile unit as it moves from cell to cell. Although any type of mobile communication device may be used as the wireless device 12, the use of a digital device would provide the most information.

Each cell site serving one of the plurality of wireless devices 12 moving through the cellular system are connected to local switches. The plurality of wireless devices 12 transmits a signal to an antenna 17 at a radio base station (RBS) 16. Two receivers 17A and 17B are associated with antenna 17. The first receiver 17A is a standard receiver that forwards the call through a standard link 19 to a local voice data network switch 18. The second receiver 17B is part of a signal collection system that will determine the location of the wireless devices. The second receiver 17B is different than most existing cell site receivers because it scans all of the radio channels simultaneously and utilizes highly accurate timing clocks. An example of such a system is the True position™ system. These systems precisely time the radio signals that are transmitted from the wireless device to various cell sites. A technique known as Time Difference of Arrival (TDOA) is used to calculate a wireless device's location, speed and direction of travel. More specifically, when the radio waves from one of the wireless devices 12 reach the signal collection systems receiver 17B installed at the RBS 16, the software associated with receiver 17B records a very precise timestamp. Once the signal has been timestamped, the timestamp information is collected and transmitted through link 19 to switch 18.

Another aspect of the present invention includes a system for monitoring performance of a wireless system. This system comprises: a plurality of wireless devices which transmit communications signals to a radio base station; a first means for receiving the communication signals and transmitting the communication signals to a switch; a second means for monitoring the communication signals and transmitting timestamp data associated with the communication signals to the switch; and a system analyzer coupled to the switch which evaluates the performance of the wireless system based on uplink performance parameters and the location of the wireless device.

Other means to determine wireless device location may include providing part of a GPS receiver with the handset; using a TDOA technique to measure data at the handset rather than switch 18; and using RF finger printing wherein the dispersion characteristics of the radio signal are used to determine location. Therefore, the specific manner of determining the location of the wireless device 12 is not important or limiting in the present invention.

The switch 18 collects the call data and the timestamp information and forwards the call data directly over a standard link 21 to a base unit 27. The base unit 27 may or may not be located at the switch 18, and link 21 may, for example, be a voice line or a Local Area Network (LAN). The base unit 27, using a system analyzer 29 such as a personal computer (PC), performs call data and location data analysis.

In the preferred embodiment, the call data is collected on the uplink at the switch 18 using Cell Traffic Recording (CTR) software. CTR is a software function provided to users of an Ericksson mobile telephone switch. CTR describes aspects of a phone call in a text format. This function allows real-time tracing of the activities of a phone call in progress. Although the preferred embodiment is directed to an Ericksson switch, other switching devices other than CTR may be used.

The call data parameters collected at the switch 18 may include, but are not limited to, the following: Forward and Reverse (or Received) Signal Strength Indication (SSI); Forward and Reverse Bit Error Rate (BER); Time Alignment; Frequency Error; Power Level of Mobile (PLM) Unit; Frequency Group; Channel; Voice Channel Group; Mobile Device Identification Number; Mobile Manufacturer Number; and Mobile Assisted Handoff (MAHO) information which may include data on neighboring cell sites as well.

Therefore, the preferred embodiment allows a system evaluator located at the PC 29 to take advantage of information from the switch 18 to analyze the service provided each of the calls from the wireless devices. The preferred embodiment allows for the performance of two types of analysis. The first one is real-time analysis that occurs during use of the wireless devices 12. The second type of analysis is post-processing analysis which occurs after completion of the operation of the wireless device 12.

Currently, the call data collected at the switch 18 contains almost all of the important information about the parameters of a call but cannot provide the current location of the wireless devices 12 that are being monitored to determine where a problem in coverage is occurring. Without the location of the wireless device much of the data collected is irrelevant. An example of an electromagnetic diagnostic tool which incorporates location information in the analysis is found in U.S. Pat. No. 6,603,866, commonly assigned and which is hereby incorporated by reference. This diagnostic tool features a PC equipped with a global positioning satellite (GPS) system which transmits location data of the wireless device while a call is in progress. However, this is an expensive and inefficient system because it requires a PC separate from the wireless device and allows for only one call to be analyzed at a time.

In the preferred embodiment, also located near the switch 18, is a TDOA Location Processor 25. The TDOA Location Processor may be an array of digital signal processors that perform all of the location processing for an entire cellular system. TDOA and geolocation algorithms monitor an entire wireless network. The timestamp differences are collected from the switch 18 through link 23a and are calculated to geometrically form hyperbolae that then intersect at or near the true location of the wireless device. The location information is then forwarded to the PC 29 through link 23b where analysis is performed matching the location of the wireless device with the call data parameters to monitor performance of the cell. The performance may then be analyzed and adjustments to the cell site may be made. For example, adjustments include changing the down tilt of the antenna 17 to take energy off the horizon or increasing or decreasing the power of the antenna. System evaluators have agreed on certain goals that must be achieved by the system parameters such as a specific set of RSSI level break points, BER thresholds forward and reverse, etc., that are a requirement for a cell site. The mobile communications analysis of the preferred embodiment may be used to expedite service improvements and to determine future build plans.

An advantage of the preferred embodiment is that the number of wireless devices that may be analyzed is only limited by the capability of the cell site. Thousands of calls may be simultaneously monitored when configuring a cell site.

FIG. 3 illustrates an exemplary process for monitoring performance of a wireless system according to an aspect of the present invention. The method comprises a) transmitting a communication signal from a wireless device to a radio base station (50); b) obtaining uplink performance parameters associated with the communication signal (52); c) obtaining location information of the wireless device by analyzing the communication signal (54); and d) evaluating the performance of the wireless system using the uplink performance parameters and the location information of the wireless device (56).

Variations on the method shown in figure 3 include evaluating the performance of the wireless system in real-time and collecting the location information of the wireless device from a plurality of radio base stations. Furthermore, there may be variations in how the step of obtaining the location information (54) is carried out. For example, obtaining location information may further comprise analyzing timestamp data or may involve using a TDOA Location Processor.

The method according to an aspect of the present invention may involve transmitting communication signals from either a single wireless device 12 or from a plurality of wireless devices. If a plurality of wireless devices 12 transmits communication signals, then the remaining steps in the method aspect of the invention also operate accordingly. For example, the uplink performance parameters (52) are obtained for all the communication signals, the location information for all the wireless devices is obtained (54). and the evaluation of the performance of the wireless system using the uplink performance parameters and the location information is performed for each of the plurality of wireless devices.

The method according to an aspect of the present invention may involved transmitting communication signals from either a single wireless device 12 or from a plurality of wireless devices. If a plurality of wireless devices 12 transmit communication signals, then the remaining steps in the method aspect of the invention also operate accordingly. For example, the uplink performance parameters (52) are obtained for all the communication signals and the location information for all the wireless devices is obtained (54) and the evaluation of the performance of the wireless system using the uplink performance parameters and the location information is performed for each of the plurality of wireless devices.

The above-described embodiment is illustrative of the principles of the present invention. Various modifications and changes may be devised by those skilled in the art without departing from the spirit and scope of the invention as set forth in the appended claims.

The invention claimed is:

1. A method of monitoring performance of a wireless system, comprising:
   (a) transmitting a call comprising a communication signal from a mobile wireless device to a radio base station, the communication signal comprising call data;
   (b) using a first receiver associated with the radio base station, receiving the communication signal and delivering the communication signal to a switch that forwards the call;
   (c) using a second receiver associated with the radio base station, receiving the communication signal and obtaining uplink performance parameters associated with the communication signal;
   (d) obtaining location information of the mobile wireless device by analyzing the communication signal received by the second receiver; and
   (e) evaluating the performance of the wireless system using the uplink performance parameters associated with the communication signal received by the second receiver from the mobile wireless device and the location information of the mobile wireless device.

2. The method of claim 1, wherein the step of evaluating the performance of the wireless system is performed in real-time.

3. The method of claim 1, wherein the location information of the mobile wireless device is collected from a plurality of radio base stations.

4. The method of claim 1, wherein the step of obtaining the location information involves analyzing timestamp data.

5. The method of claim 1, wherein the step of obtaining the location information involves using a time difference of arrival location processor.

6. The method of claim 5, wherein the time difference of arrival location processor is in the mobile wireless device.

7. The method of claim 5, wherein the time difference of arrival location processor is in the wireless system.

8. The method of monitoring performance of a wireless system according to claim 1, wherein obtaining location information of the mobile wireless device is accomplished using a global positioning system unit in the mobile wireless device.

9. The method of monitoring performance of a wireless system according to claim 1, wherein obtaining location information of the mobile wireless device is accomplished using RF finger printing using dispersion characteristics of the communication signal.

10. The method of claim 1, further comprising locating a geographical area associated with faulty coverage based on the performance evaluation.

11. The method of claim 1, wherein the evaluation is based on mobile-assisted handoff information.

12. The method of claim 1, further comprising generating an information report concerning signal coverage of a geographical area based on the performance evaluation.

13. The method of claim 1, further comprising adjusting the radio base station based on the performance evaluation.

14. A method of monitoring performance of a wireless system, comprising:
   (a) transmitting respective calls comprising respective communication signals from a plurality of mobile wireless devices to a radio base station, the communication signals comprising respective call data;
   (b) using a first receiver associated with the radio base station, receiving the communication signals and delivering the communication signals to a switch that forwards the respective calls;

(c) using a second receiver associated with the radio base station, receiving the communication signals and obtaining uplink performance parameters associated with the communication signals;

(d) obtaining location information of the plurality of mobile wireless devices by analyzing the communication signals; and (e) evaluating the performance of the wireless system using the uplink performance parameters and the location information of each of the plurality of mobile wireless devices.

15. The method of claim 14, wherein the step of evaluating the performance of the wireless system is performed in real-time.

16. The method of claim 14, wherein the location information of the plurality of mobile wireless devices is collected from a plurality of radio base stations.

17. The method of claim 14, wherein the step of obtaining the location information involves analyzing timestamp data.

18. The method of claim 14, wherein the step of obtaining the location information involves using a time difference of arrival location processor.

19. The method of claim 18, wherein a time difference of arrival location processor is in each of the plurality of mobile wireless devices.

20. The method of claim 18, wherein the time difference of arrival location processor is in the wireless system.

21. A system for monitoring performance of a wireless system, said system comprising:

a plurality of wireless devices which transmit communication signals to a radio base station, the communication signals comprising respective call data and at least one uplink performance parameter;

a first receiver located at the radio base station which receives the communication signals and transmits the communication signals to a switch;

a second receiver located at the radio base station which monitors the communication signals and transmits timestamp data associated with the communication signals to the switch, the timestamp data being associated with respective locations of the wireless devices; and a system analyzer coupled to the switch which evaluates the performance of the wireless system based on The respective uplink performance parameters and the respective locations of the wireless devices.

22. The system of claim 21, wherein a time difference of arrival location processor is coupled to the switch and to the system analyzer.

23. The system for monitoring performance of a wireless system of claim 21, wherein the system analyzer is configured to indicate a geographical location associated with faulty coverage based on the performance evaluation.

24. A system for monitoring performance of a wireless system, said system comprising:

a plurality of wireless devices which transmit respective calls comprising respective communications signals to a radio base station, the communication signals comprising respective call data and at least one respective uplink performance parameter;

a first receiving means associated with the radio base station for receiving the communication signals and transmitting the communication signals to a switch means for forwarding the calls;

a second receiving means associated with the radio base station for receiving the communication signals for determining respective locations of the wireless devices:

a monitoring means for monitoring the communication signals received by the second receiving means and for transmitting timestamp data associated with the communication signals to the switch means, the timestamp data being associated with respective locations of the wireless devices; and a system analyzer means, coupled to the switch means, for evaluating the performance of the wireless system based on the respective uplink performance parameters and the respective locations of the wireless devices.

25. A system for monitoring performance of a wireless system, the wireless system including a plurality of wireless devices transmitting communication signals to a radio base station, the communication signals comprising respective call data and at least one uplink performance parameter, said system comprising:

a first receiver located at the radio base station that receives the communication signals and transmits the communication signals to a switch;

a second receiver located at the radio base station which receives respective location information associated with each of the plurality of wireless devices, the location information being associated with the respective communication signals; and a system analyzer coupled to the switch which evaluates the performance of the wireless system based on the at least one uplink performance parameter and the respective locations of the wireless devices.

26. The system of claim 25, wherein the second receiver receives location information using RF finger printing data associated with distortion characteristics of the communication signals.

27. The system of claim 25, wherein the second receiver receives location information from global position system units in each of the plurality of wireless devices.

28. A system for monitoring performance of a wireless system, the wireless system including a wireless device transmitting communication sianals to a radio base station, the communication signals comprising call data produced by the wireless device and including at least one uplink performance parameter, said system comprising:

a first receiver located at the radio base station that receives the communication signals and transmits the communication signals to a switch that forwards a call associated with the communication sianals;

a location measurement unit in the wireless device that determines the location of the wireless device and includes corresponding location data in the communication signals;

a second receiver located at the radio base station that receives the at least one uplink performance parameter and the location data in the communication signals; and a system analyzer, coupled to the switch, which evaluates the performance of the wireless system based on the received at least one uplink performance parameter and the location of the wireless device.

29. The system of claim 28, wherein the location information measurement unit is associated with a time difference of arrival technique.

30. A method of assessing wireless system performance, comprising:

using a first receiver, collecting downlink call data associated with a call to a mobile wireless device, the downlink call data being collected in real time;

using a second receiver, collecting uplink call data associated with the call to the mobile wireless device, the uplink call data also being collected in real time;

obtaining location information associated with the mobile wireless device; and based on the downlink call data, the uplink call data, and the location information, evaluating system performance.

31. The method of claim 30, further comprising removing transient effects from the system performance evaluation based on the uplink call data and the location information.

* * * * *